US007938548B2

(12) United States Patent
Nozaki et al.

(10) Patent No.: US 7,938,548 B2
(45) Date of Patent: May 10, 2011

(54) PROJECTION DEVICE

(75) Inventors: Hirotake Nozaki, Port Washington, NY (US); Nobuhiro Fujinawa, Yokohama (JP); Akira Ohmura, Tokyo (JP)

(73) Assignee: Nikon Corporation, Tokyo (JP)

( * ) Notice: Subject to any disclaimer, the term of this patent is extended or adjusted under 35 U.S.C. 154(b) by 307 days.

(21) Appl. No.: 11/988,078

(22) PCT Filed: Jun. 29, 2006

(86) PCT No.: PCT/JP2006/312999
§ 371 (c)(1),
(2), (4) Date: Dec. 28, 2007

(87) PCT Pub. No.: WO2007/004512
PCT Pub. Date: Jan. 11, 2007

(65) Prior Publication Data
US 2009/0141245 A1 Jun. 4, 2009

(30) Foreign Application Priority Data

Jul. 1, 2005 (JP) .................................. 2005-193899
Sep. 12, 2005 (JP) .................................. 2005-263660

(51) Int. Cl.
G03B 21/14 (2006.01)

(52) U.S. Cl. .............. 353/119; 353/63; 353/70; 353/60; 353/85; 353/52; 353/57; 315/274; 315/276; 315/246; 315/282; 315/283; 315/284; 315/219; 348/771; 348/742; 348/743; 361/87; 361/92; 361/90; 320/134; 320/135; 320/136

(58) Field of Classification Search ................. 353/63, 353/70, 60, 85, 52, 57, 61, 119; 348/771; 348/742, 743; 315/274, 276, 246, 282, 283, 315/284, 29 R, 219, DIG. 7; 361/87, 92, 361/90, 91; 320/134, 135, 136
See application file for complete search history.

(56) References Cited

U.S. PATENT DOCUMENTS

| 5,136,397 | A | * | 8/1992 | Miyashita ..................... 348/748 |
| 5,390,130 | A | * | 2/1995 | Watanabe et al. ............... 702/63 |
| 5,847,748 | A | * | 12/1998 | Laughlin ....................... 725/105 |
| 6,626,543 | B2 | * | 9/2003 | Derryberry .................. 353/119 |
| 2001/0012065 | A1 | * | 8/2001 | Ejima et al. .................. 348/232 |
| 2001/0029588 | A1 | * | 10/2001 | Nakamura et al. ............ 713/300 |
| 2002/0063855 | A1 | | 5/2002 | Williams |
| 2005/0007514 | A1 | | 1/2005 | Faris et al. |
| 2005/0012909 | A1 | | 1/2005 | Kokin et al. |
| 2005/0030494 | A1 | * | 2/2005 | Kumai ......................... 353/119 |

(Continued)

FOREIGN PATENT DOCUMENTS

JP A 60-162236 8/1985

(Continued)

Primary Examiner — Georgia Y Epps
Assistant Examiner — Sultan Chowdhury
(74) Attorney, Agent, or Firm — Miles & Stockbridge P.C.

(57) ABSTRACT

A projection device includes: a projector unit that has at least a light source and a projection optical system housed in a chassis; a control unit that is assembled with a chassis separate from the chassis of the projector unit; and a rotation support member that rotatably supports the projector unit and the control unit around a rotation axis that extends perpendicular to a surface of the chassis of the projector unit and a surface of the chassis of the control unit, with these surfaces facing to one another.

15 Claims, 8 Drawing Sheets

U.S. PATENT DOCUMENTS

| | | |
|---|---|---|
| 2007/0109504 A1* | 5/2007 | Miyazawa ............... 353/67 |
| 2007/0195173 A1* | 8/2007 | Nozaki et al. ........... 348/216.1 |

FOREIGN PATENT DOCUMENTS

| | | |
|---|---|---|
| JP | A-04-319930 | 11/1992 |
| JP | A-09-172201 | 6/1997 |
| JP | A 09-319006 | 12/1997 |
| JP | A-10-333247 | 12/1998 |
| JP | A 2000-148306 | 5/2000 |
| JP | A 2000-236375 | 8/2000 |
| JP | A 2000-250455 | 9/2000 |
| JP | A-2000-339053 | 12/2000 |
| JP | A 2002-077377 | 3/2002 |
| JP | A-2002-091417 | 3/2002 |
| JP | A 2003-084368 | 3/2003 |
| JP | 2003149733 A * | 5/2003 |
| JP | A 2003-149633 | 5/2003 |
| JP | A 2003-149733 | 5/2003 |
| JP | A-2003-248463 | 9/2003 |
| JP | A 2003-280105 | 10/2003 |
| JP | A 2004-069997 | 3/2004 |
| JP | A 2004-145997 | 5/2004 |
| JP | A-2005-55812 | 3/2005 |
| JP | A-2005-84075 | 3/2005 |

* cited by examiner

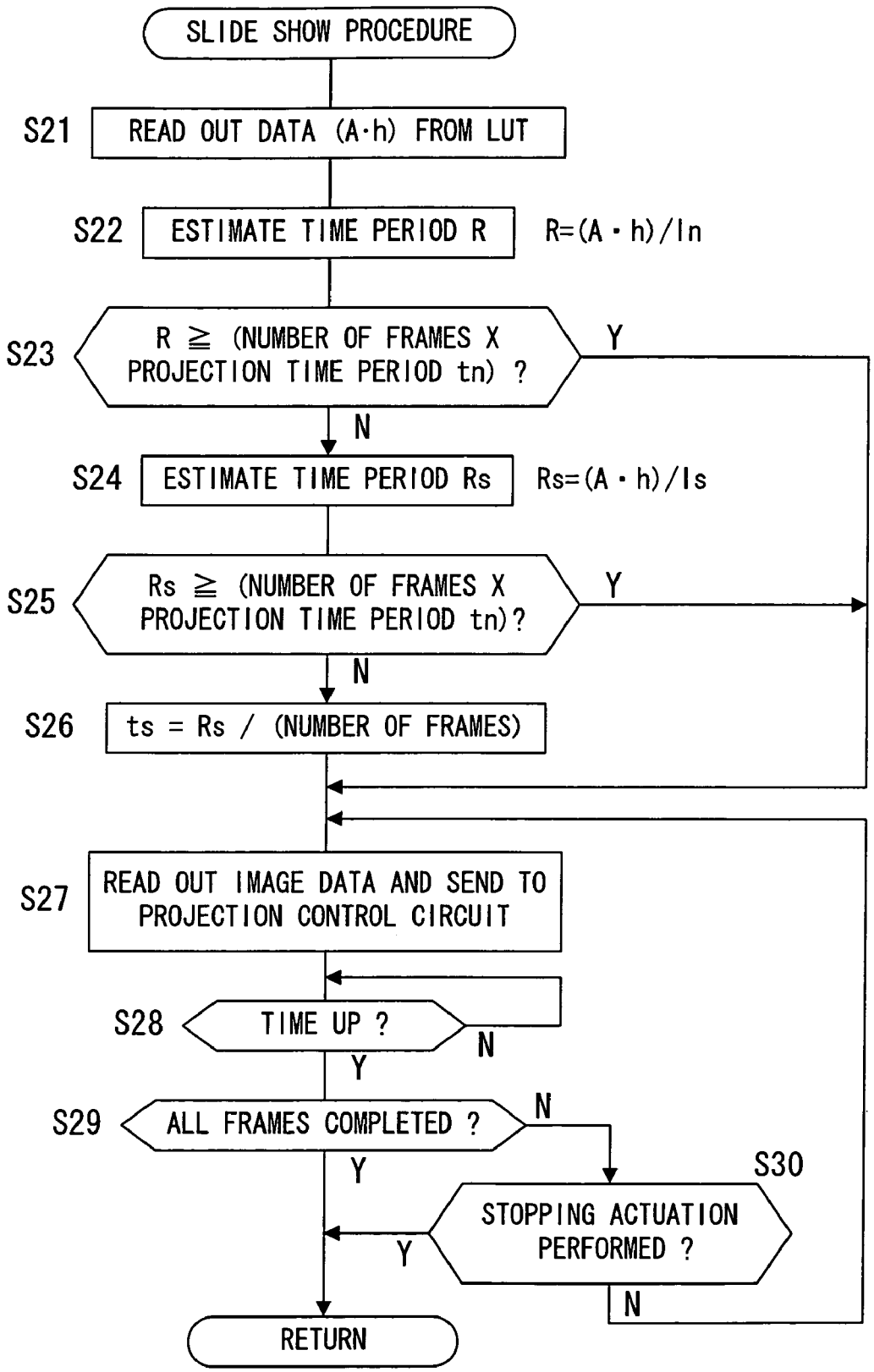

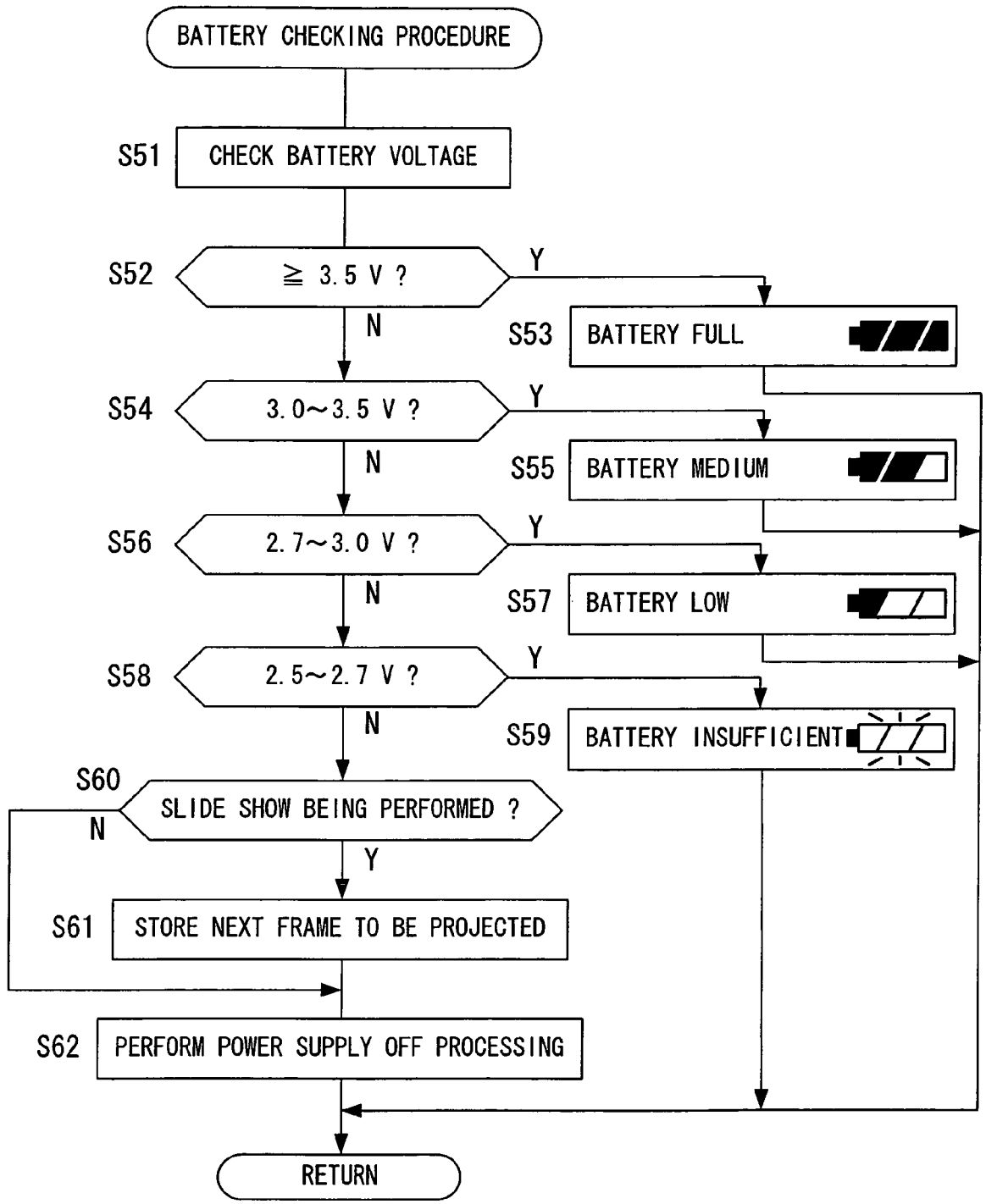

PROJECTION DEVICE

TECHNICAL FIELD

The present invention relates to a projection device that projects an optical image.

BACKGROUND ART

An electronic device consisting of a portable telephone device or the like equipped with a projection function is per se known (refer to Patent Document 1). With the portable telephone device equipped with a projector described in Patent. Document 1, a person conversing upon the telephone is able to project information upon the palm of his own hand while conversing, and can also project information upon a wall surface while conversing.

Patent Document 1: Japanese Laid-Open Patent Publication No. 2000-236375

DISCLOSURE OF THE INVENTION

Problems to be Solved by the Invention

Since the projector of Patent Document 1 is mounted to the chassis of a telephone device that is suitable for communication application, it is not necessarily well adapted for projection application. When a device that is dedicated only to projection is to be constructed, the telephone function is unnecessary and it is not necessary for the device to take a posture as a telephone device. Accordingly a compact form suitable for projection application is desirable.

Means for Solving the Problems

A projection device according to a first aspect of the present invention includes: a projector unit that comprises at least a light source and a projection optical system housed in a chassis; a control unit that is assembled with a chassis separate from the chassis of the projector unit; and a rotation support member that rotatably supports the projector unit and the control unit around a rotation axis that extends perpendicular to a surface of the chassis of the projector unit and a surface of the chassis of the control unit, with these surfaces facing to one another.

In the projection device according to the first aspect, it is preferable that the rotation support member is provided at one end of the projector unit in a longitudinal direction of the projector unit; and the projection optical system is provided towards another end from a center of the projector unit in the longitudinal direction. The projection optical axis of the projector unit may be included in a plane that is perpendicular to the rotation axis of the rotation support member. The projector unit may further include a heat dissipation member that dissipates heat generated by the light source; and the control unit may further include a battery.

It is preferable that the control unit controls the light source to be turned ON or OFF, according to a rotational angle of the rotation support member. It is preferable that according to a command for turning the light source OFF, the control unit stops or limits a supply of electrical power to the projector unit, while maintaining a supply of electrical power within the control unit. According to a time up signal, the control unit may stop or limit the supply of electrical power to the projector unit, while maintaining the supply of electrical power within the control unit.

In the projection device according to the first aspect, the rotation support member and the heat dissipation member of the projector unit may be integrated together so as to conduct heat. Heat may be conducted from the heat dissipation member to an inner side of a surface of the projector unit that is opposed to the control unit. A display corresponding to a surface temperature may be brought up on a chassis surface of the projector unit or of the control unit. It is preferable that a seal made from a thermally insulating material in a shape of a band is adhered to a surface of at least one of the chassis of the projector unit and the chassis of the control unit.

A projection device according to a second aspect of the present invention includes: a projection unit that projects an image; a voltage detection device that detects a voltage of a battery that drives the projection unit; and a projection control device that controls the projection unit based upon the voltage detected by the voltage detection device, so as to change a mode of projection image.

In the projection device according to the second aspect, it is preferable that if the detected voltage is lower than a predetermined value, the projection control device controls the projection unit so as to include battery information in the projection image. If the detected voltage is lower than a predetermined value, the projection control device may control the projection unit so as to lower a luminance of the projection image. It is preferable that the projection control device further controls the projection unit so as to compensate by image processing for decrease in the luminance of the projection image.

If the detected voltage is lower than a predetermined value, the projection control device may control the projection unit so as to convert the projection image to a monochrome image. If the detected voltage is lower than a predetermined value, the projection control device may control the projection unit so as to reduce the projection image in size. It is preferable that the projection control device controls the projection unit so as to project battery information along with the projection image after reduction in size.

It is preferable for the projection device according to the second aspect to further include a possible projection time period estimation device that estimates, using the voltage detected by the voltage detection device, a time period over which projection is possible; and that if a time period required for projection by the projection unit is longer than the time period over which projection is possible as estimated by the possible projection time period estimation device, the projection control device controls the projection unit so as to reduce an electrical power to be consumed by a light source of the projection device, thereby lowering a luminance of the projection image. The possible projection time period estimation device may again estimate a time period over which projection is possible in a state in which the electrical power to be consumed has been reduced; and if the time period required for projection by the projection unit is longer than the time period over which projection is possible as thus re-estimated by the possible projection time period estimation device, the projection control device may control the projection unit so as to shorten the time period required for projection.

Advantageous Effects of the Invention

According to the present invention, it is possible to supply a compact projection device that is well adapted to projection application.

BRIEF DESCRIPTION OF THE DRAWINGS

FIG. 7 is a flow chart for explanation of a processing flow for slide show processing; and FIG. 8 is a flow chart for explanation of a processing flow for battery checking processing.

BEST MODE FOR CARRYING OUT THE INVENTION

Embodiment One

Figure 1:
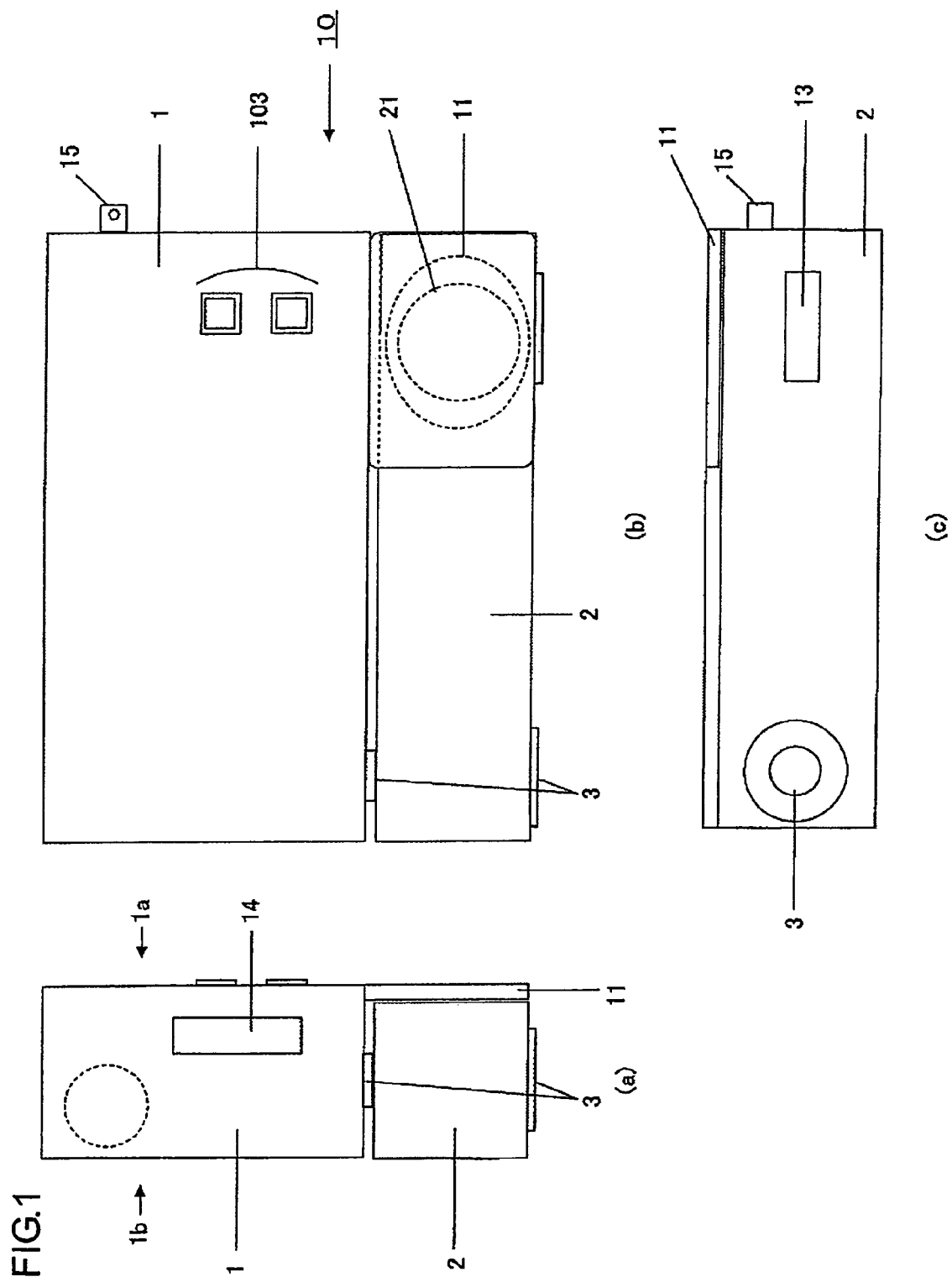
FIGS. 1(*a*), 1(*b*), and 1(*c*) are respectively a left side view, a plan view, and an elevation view of a projector according to a first embodiment of the present invention.

In the following, a preferred embodiment for implementation of the present invention will be explained with reference to the drawings. FIGS. 1(a) through 1(c) are views from three sides of a portable battery driven type compact projector according to the first embodiment of the present invention, that can be used while being held in the user's hand. FIG. 1(a) is a left side view, FIG. 1(b) is a plan view, and FIG. 1(c) is an elevation view. In this projector 10, a chassis of a control unit 1 and a chassis of a projector unit 2 are mutually supported by a hinge unit 3 so as to be capable of rotating freely with respect to one another. This hinge unit 3 is provided towards one end portion of the projector unit 2 in its longitudinal direction, with the rotation shaft of the hinge unit 3 being orthogonal to the mutually opposing surfaces of the chassis of the control unit 1 and the chassis of the projector unit 2. Moreover, a click mechanism not shown in the figures is provided to the hinge unit 3, and this click mechanism operates so as to set the relative angle θ between the control unit 1 and the projector unit 2 to, for example, a 90° position, a 180° position, or a 270° position. It should be understood that this hinge unit 3 may be constructed so as to be capable of mutually supporting the control unit 1 and the projector unit 2 at any desired relative angular click positions, i.e. not only at those specified above. A strap fitting member 15 is provided to the control unit 1, to which a strap or the like not shown in the figures may be installed.

FIGS. 2(a) through 2(c) are figures showing one example of three operational modes to which the projector 10 can be set by rotation of the hinge unit 3. FIG. 2(a) is a figure showing the projector unit 2 in a state to which it is positioned by rotation of the hinge unit 3 at a relative angle θ of 90°; FIG. 2(b) is a figure showing the projector unit 2 in a state to which it is positioned by rotation of the hinge unit 3 at a relative angle θ of 180°; and FIG. 2(c) is a figure showing the projector unit 2 in a state to which it is positioned by rotation of the hinge unit 3 at a relative angle θ of 270°. In each of FIGS. 2(a) through 2(c), the ray bundle B is the projected beam generated from the projector unit 2. The states of the projector 10 shown in FIGS. 2(a) and 2(b) are principally used during hand-held operation. And the state of the projector 10 shown in FIG. 2(c) is used both during hand-held operation, and also when the projector 10 is set upon a plane support surface.

When the projector 10 is set upon a plane surface, it may be laid with either an upper surface 1a of the control unit 1 or its lower surface 1b facing downwards. And, when the modes of the projector 10 shown in FIGS. 2(a) and 2(b) are being employed, the projector 10 is set with its surface 1a downwards. However, when the mode of the projector 10 shown in FIG. 2(c) is to be employed, the projector 10 is laid with its surface 1b downwards, so that an operation member 103 can be actuated. Since the size of the control unit 1 is larger than that of the projector unit 2, accordingly the attitude of the projector 10 upon a plane is stable even though the projector unit 2, that is rotated, is not in contact with the supporting plane. It should be understood that, when the relative angle θ between the control unit 1 and the projector unit 2 is set to zero (the storage position) as shown in FIG. 1(a) through 1(c), it is possible to place the projector 10 upon a plane with either the upper surface 1a or the lower surface 1b of the control unit 1 facing downwards.

A lens cover 11, that extends from the surface 1a, is provided to the control unit 1 as shown in FIGS. 1(a) through 1(c). In this state in which the projector 10 is set to its storage attitude (in which the relative angle θ is equal to 0°), this lens cover 11 covers an opening 21 of the projector unit 2, thus protecting a projection lens that is internal to the projector unit 2. The lens cover 11 is made as a transparent member, so that projection through the lens cover 11 is possible, even when the projector 10 is in its storage position. It should be understood that it is desirable for the position of the opening 21 to be arranged on the opposite side, in the longitudinal direction, of the center of the projector unit 2 to the hinge unit 3.

Figure 3:
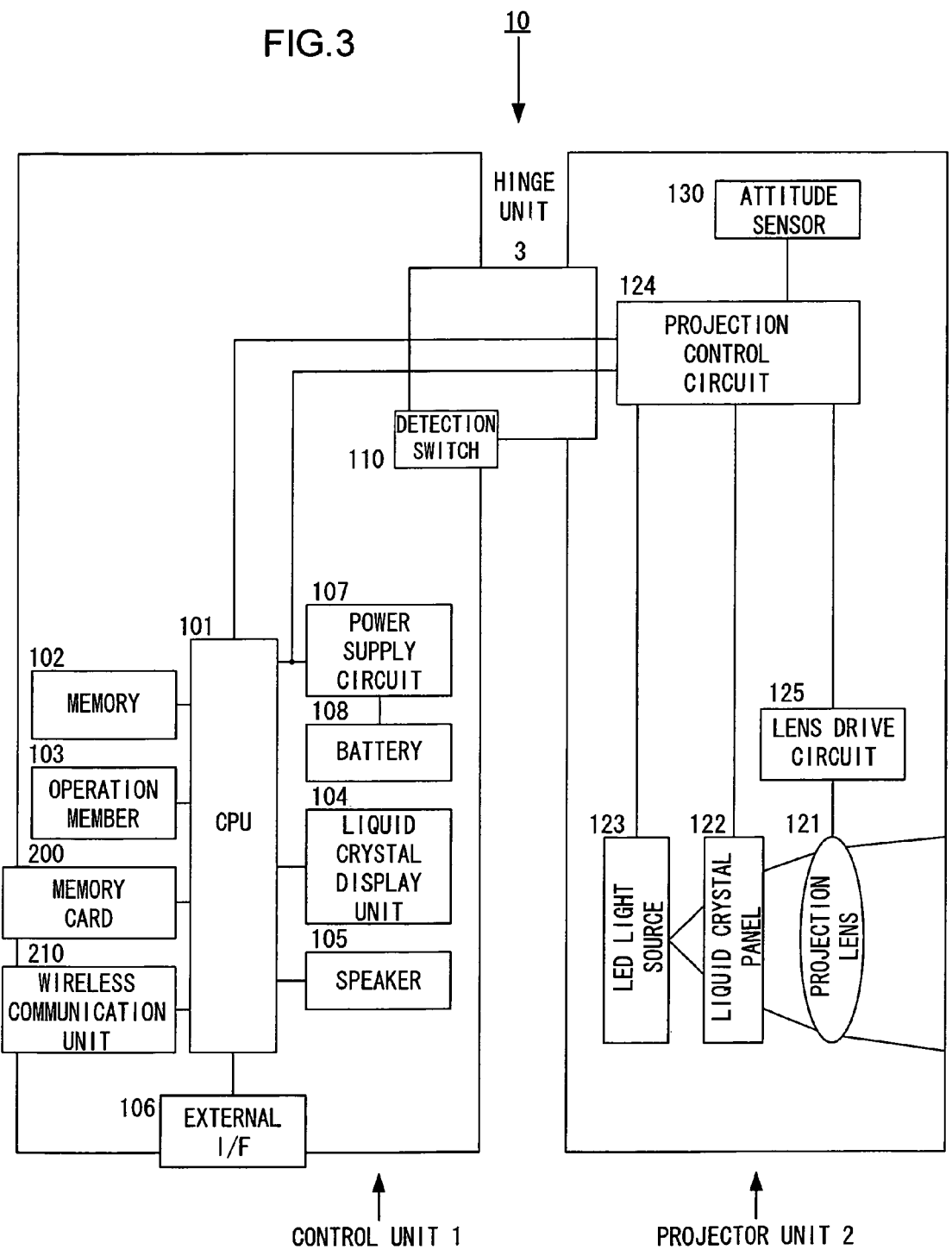
FIG. 3 is a block diagram for explanation of the circuit structure of this projector.

FIG. 3 is a block diagram for explanation of the circuit structure of the projector 10. In FIG. 3, to the control unit 1, there are provided a CPU 101, a memory 102, the operation member 103, a liquid crystal display unit 104, a speaker 105, an external interface (I/F) 106, and a power supply circuit 107; and a battery 108, a memory card 200, and a wireless communication unit 210 are also attached.

To the projector unit 2, there are provided a projection lens 121, a liquid crystal panel 122, a LED light source 123, a projection control circuit 124, a lens drive circuit 125, and an attitude sensor 130.

Based upon a control program and functioning as a controller, the CPU 101 performs a predetermined calculation or the like using signals that are inputted from various sections that make up the projector 10, and controls the projection operation of the projector 10 by outputting control signals to various sections of the projector 10. It should be understood that this control program is stored in a non-volatile memory within the CPU 101, not shown in the figures. Furthermore, by employing image processing, the CPU 101 performs trapezoidal distortion compensation (keystone compensation) upon the image data that is projected by the projector 10.

The memory 102 is used as a working memory for the CPU 101. And the operation member 103 includes a main switch, a light source ON/OFF switch, and the like, and outputs actuation signals corresponding to these actuation switches to the CPU 101.

The memory card 200 is constituted by a non-volatile memory, and is made so as to be removably fitted into a card slot 14 (see FIG. 1) of the control unit 1. It is possible to write, store, and read out data such as image data and audio data to and from this memory card 200, upon command from the CPU 101.

The wireless communication unit 210 is made so as to be removably fitted to the control unit 1, and transmits data to and from an external device, upon command by the CPU 101.

This data that is transmitted and received may be image data and/or audio data, or may be control data for the projector 10.

Upon command by the CPU 101, the external interface 106 transmits data to and from an external device via a cable or a cradle not shown in the figures. This data that is transmitted and received may be image data and/or audio data, or may be control data for the projector 10.

The speaker 105 replays audio that has been outputted from the CPU 101 as a sound signal. And, upon command from the CPU 101, the liquid crystal display unit 104 displays information such as text or the like. Such text information may be information specifying the operational state of the projector 10, or an operation menu or the like.

The battery 108 is constituted as a rechargeable secondary battery, and supplies electrical power to the various sections within the projector 10. And the power supply circuit 107 includes a DC/DC conversion circuit, a charging circuit, and a voltage detection circuit, and, apart from converting the voltage of the battery 108 to the voltage(s) required by the various sections within the projector 10, also charges the battery 108 with a charging current that is supplied via the external interface (I/F) 106, if the voltage of the battery 108 has become low and its remaining capacity is decreased.

An opening angle detection switch 110 detects the rotational angle of the hinge unit 3, and outputs an OFF signal to the CPU 101 if it detects that the relative angle θ between the control unit 1 and the projector unit 2 is 0° (the storage attitude), while it outputs an ON signal if it detects any other relative angle.

Upon command by the CPU 101, the projection control circuit 124 controls each of the liquid crystal panel 122, the LED light source 123, and the lens drive circuit 125. This projection control circuit 124 supplies electrical current to the LED light source 123, according to a LED drive signal that is outputted from the CPU 101. And the LED light source 123 illuminates the liquid crystal panel 122 at a brightness corresponding to this supplied electrical current.

Moreover, the projection control circuit 124 generates a liquid crystal panel drive signal according to image data that is transmitted from the CPU 101, and drives the liquid crystal panel 122 with this generated drive signal. In concrete terms, it applies a voltage corresponding to the image signal to each picture element in a liquid crystal layer. The arrangement of the liquid crystal molecules in this liquid crystal layer to which these voltages are applied changes, so that the transmittivity of the liquid crystal layer to light changes. By modulating the light from the LED light source 123 in this manner according to the image signal, the liquid crystal panel 122 creates an optical image. This liquid crystal panel 122 has an effective picture element region that is approximately square in shape, i.e. that consists of the same number of effective picture elements in the vertical and horizontal directions.

The lens drive circuit 125 shifts the projection lens 121 forwards and backwards along a direction orthogonal to the optical axis, based upon a control signal outputted from the projection control circuit 124. And the projection lens 121 projects an optical image that is emitted from the liquid crystal panel 122 towards a screen or the like.

The attitude sensor 130 detects the attitude of the projector unit 2, and outputs its detection signal to the CPU 101 via the projection control circuit 124. Due to this, the CPU 101 is able to decide whether the projector 10 is in the state of being in its storage attitude as shown in FIG. 1, or is in any of the states shown in FIG. 2(*a*) through FIG. 2(*c*).

(Offsetting of the Projected Image)

The CPU 101 changes the direction of emission of the ray bundle B by shifting the projection lens 121 in a direction orthogonal to the optical axis, and thereby offsets the projected image. And, if the CPU 101 has decided that the projector is in the state shown in FIG. 2(*a*), then it causes the ray bundle B to be emitted in a direction somewhat away from the surface 1*b*, so that no portion of the ray bundle B strikes the chassis of the control unit 1. In other words, the CPU 101 shifts the projection lens 121 so that the upper edge of the ray bundle B is directed more downward than the prolongation of the surface 1*b*.

Figure 2:
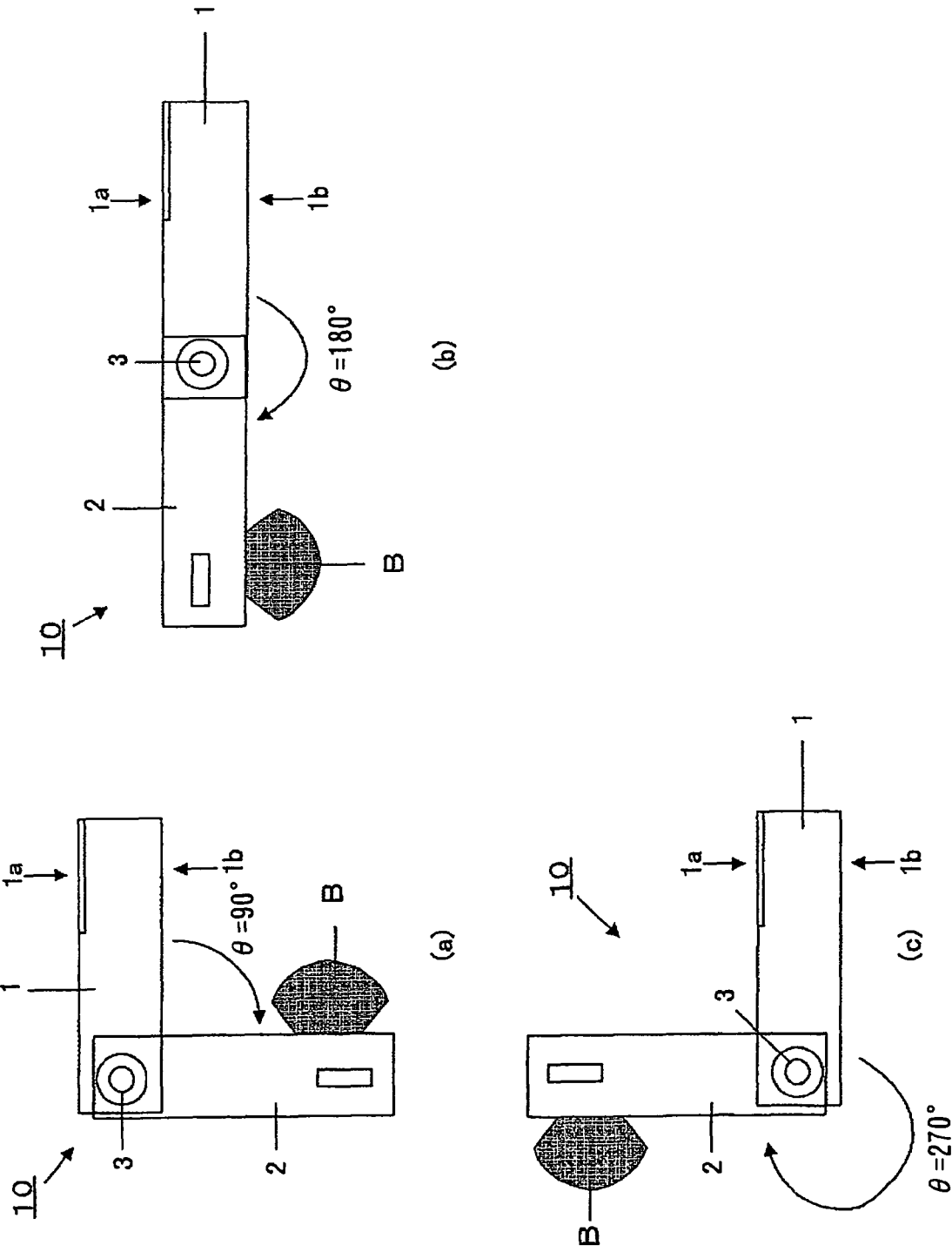
FIG. 2(a) is a figure showing the projector shown in FIGS. 1(a) through 1(c) as rotated to a relative angle of θ=90°.
FIG. 2(b) shows the projector as rotated to a relative angle of θ=180°.
FIG. 2(c) shows the projector as rotated to a relative angle of θ=270°.

Moreover, if the CPU 101 has decided that the apparatus is in the state shown in FIG. 2(*c*), then it causes the ray bundle B to be emitted in a direction somewhat away from the prolongation of the surface 1*b*, so that no portion of the ray bundle B strikes the surface (not shown in the figure) upon which the projector is mounted. In other words, the CPU 101 shifts the projection lens 121 so that the lower edge of the ray bundle B is directed more upward than the prolongation of the surface 1*b*.

Furthermore, if the CPU 101 has decided that the apparatus is in the state shown in FIG. 2(*b*), then it shifts the projection lens 121 so as to cause the ray bundle B to be emitted in a direction that is orthogonal with respect to the prolongation of the surface 1*b*. Moreover it should be understood that, if it is decided that the projector is in the storage attitude of FIG. 1, then the projection lens 121 is shifted so as to cause the ray bundle B to be emitted in a direction that is orthogonal with respect to the prolongation of the surface 1*a*.

It would also be acceptable to provide a structure in which this offsetting of the projected image is performed in some other manner than by shifting the projection lens 121, for example by shifting the liquid crystal panel 122 and the LED light source 123 in a direction that is orthogonal to the optical axis. In other words, it would be possible to implement offsetting of the projected image by changing the relative positional relationship between the projection lens 121 and the liquid crystal panel 122 in a direction that is orthogonal to the optical axis.

(Keystone Compensation of the Projected Image)

When any of the projection lens 121, the liquid crystal panel 122, and the LED light source 123 is shifted in a direction orthogonal to the optical axis, then keystone compensation is performed upon the projected data in correspondence to this shifting amount. If only the above described offsetting were to be applied to the projected image, then the shape of the projected image would be changed to a trapezoidal shape. Accordingly, the CPU 110 performs electronic keystone compensation by image processing the projected image in order to compensate it from a trapezoidal shape to a rectangular shape. For each of the situations shown in FIGS. 2(*a*) through 2(*c*), an initial compensation value is stored in advance within the CPU 101 for compensating the projected image to a rectangular shape. The CPU 101 performs keystone compensation processing upon the data for the projected image in the memory 102, based upon the appropriate one of these initial compensation values. It should be understood that it would also be acceptable to arrange to perform this keystone compensation processing, not only in the various states shown in FIGS. 2(*a*) through 2(*c*), but for any angle θ.

(Internal Arrangement)

Figure 4:
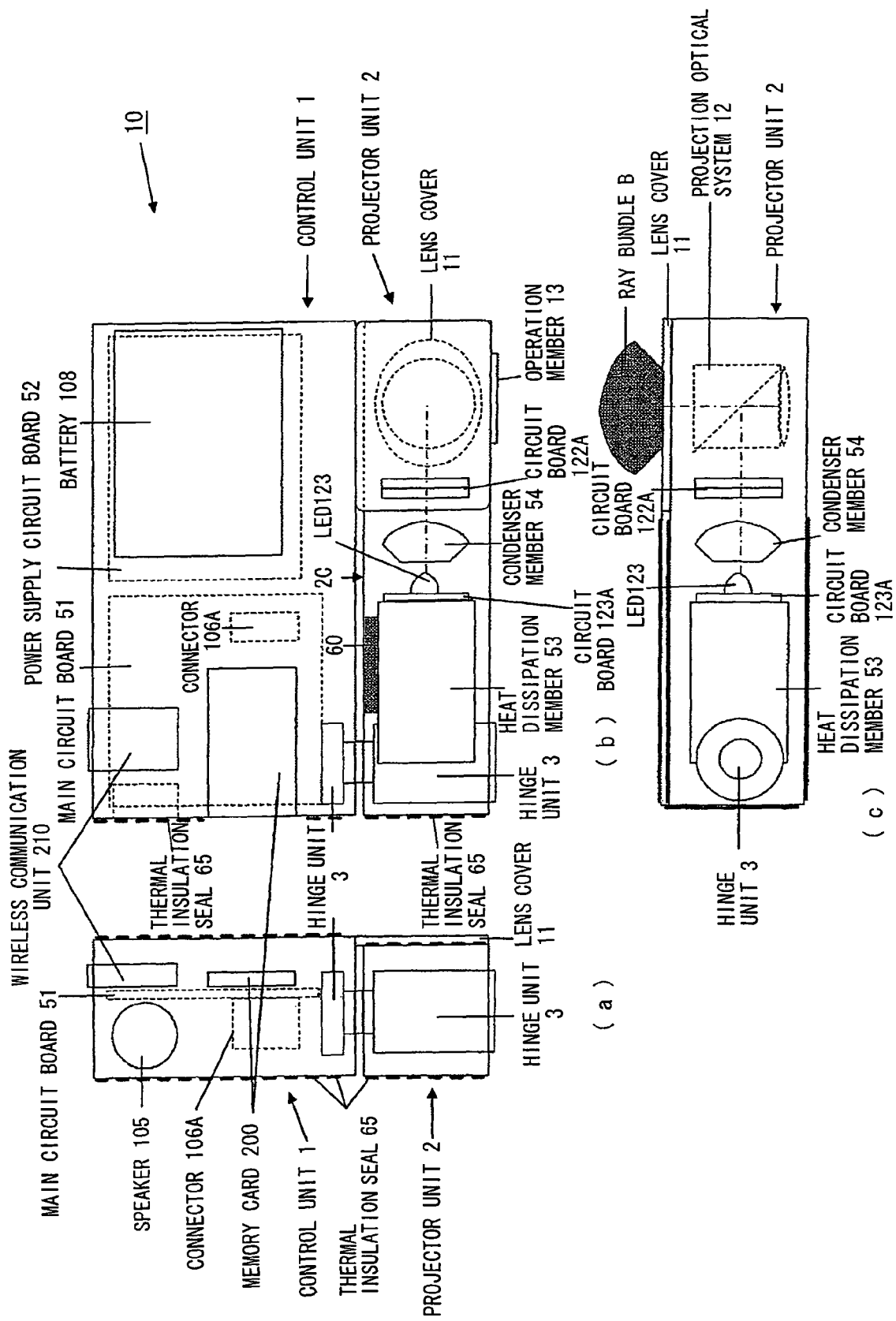
FIGS. 4(a), 4(b), and 4(c) are figures showing the internal arrangement of this projector, and respectively show a left side view, a plan view, and an elevation view thereof.

The arrangement of the principal sections within the chassis of the projector 10 will now be explained with reference to the internal arrangement drawings shown in FIGS. 4(*a*) through 4(*c*). FIG. 4(*a*) is a left side view, FIG. 4(*b*) is a plan view, and FIG. 4(*c*) is an elevation view. A main circuit board 51, a power supply board 52, and the speaker 105 are disposed within the control unit 1, and the battery 108 is also included therein. The wireless communication unit 210 is installed upon a connector not shown in the figures that is provided upon the main circuit board 51, and the memory card 200 is likewise installed upon a card connector not shown in the figures that is provided upon the main circuit board 51. A connector 106A is also provided upon the main circuit board 51 for connection of the external interface (I/F) 106.

To the projector unit 2, there are provided a projection optical system 12 that includes the projection lens 121, a board 122A on which the liquid crystal panel 122 is provided, a condensing optical system 54, a board 123A one which the LED light source 123 is provided, and a heat dissipation member 53 that dissipates heat generated by the LED light source 123 upon the board 123A. The projection optical system 12 bends a ray bundle having passed through the liquid crystal panel 122 and progressing in the rightwards direction in FIG. 4(c) within the projector unit 2 so as to emit it in the upwards direction.

This projection optical system 12 is adapted to shift forwards or backwards along the direction of the optical axis (in the leftwards or rightwards direction in FIGS. 4(b) and 4(c)) according to the amount of operation of a focus adjustment operation member 13 shown in FIG. 4(b), when this focus adjustment operation member 13 is operated by being slid in the leftwards or rightwards direction. Focus adjustment of the projected image is performed by this forwards and backwards shifting.

The heat dissipation member 53 is formed from a material that has high thermal conductivity. Furthermore, this heat dissipation member 53 is integrated within the projector unit 2 with the hinge unit 3 so that, according to this structure, heat is conducted from the heat dissipation member 53 to the hinge unit 3. The heat dissipation member 53 is adapted, not only to dissipate heat from heat dissipation fins (not shown in the figures) that are formed upon its surface, but also to dissipate heat to the chassis of the projector unit 2. In concrete terms, at the inside of that surface 2c of the projector unit 2 that opposes the control unit 1 when the apparatus is in the storage attitude, a mass of filler material 60 of high thermal conductivity may be charged between the heat dissipation member 53 and the chassis, or a sheet of material of high thermal conductivity may be sandwiched between them.

On the other hand, in the control unit 1 as well, the hinge unit 3 and the chassis of the control unit 1 are also constructed so as to conduct heat. For example, a filler material (not shown in the figures) of high thermal conductivity may be charged between the hinge unit 3 and the chassis of the control unit 1, or a sheet of material of high thermal conductivity may be sandwiched between them. It should be understood that thermally insulating seals 65 that are formed from a material whose thermal insulation characteristic is high are adhered in the shape of bands (for example over a 2 mm gap) to the surfaces of the chassis of the control unit 1 and of the projector unit 2 close to the hinge unit 3, so that, with this structure, when the user grasps the projector 10, he does not directly touch the surface of its chassis.

A temperature seal is adhered to the surface 2c of the projector unit 2. This temperature seal may, for example, be one upon which a character display "Caution: high temperature" emerges when the temperature of the surface upon which it is adhered reaches 40° C., while this display disappears when the temperature of the surface upon which it is adhered is below 40° C. It should be understood that it would also be acceptable for this temperature seal to be one upon which a number appears corresponding to the temperature of the surface upon which it is adhered, or one upon which a different color appears for each temperature stage of the surface upon which it is adhered.

(The Main Processing Program)

Figure 5:
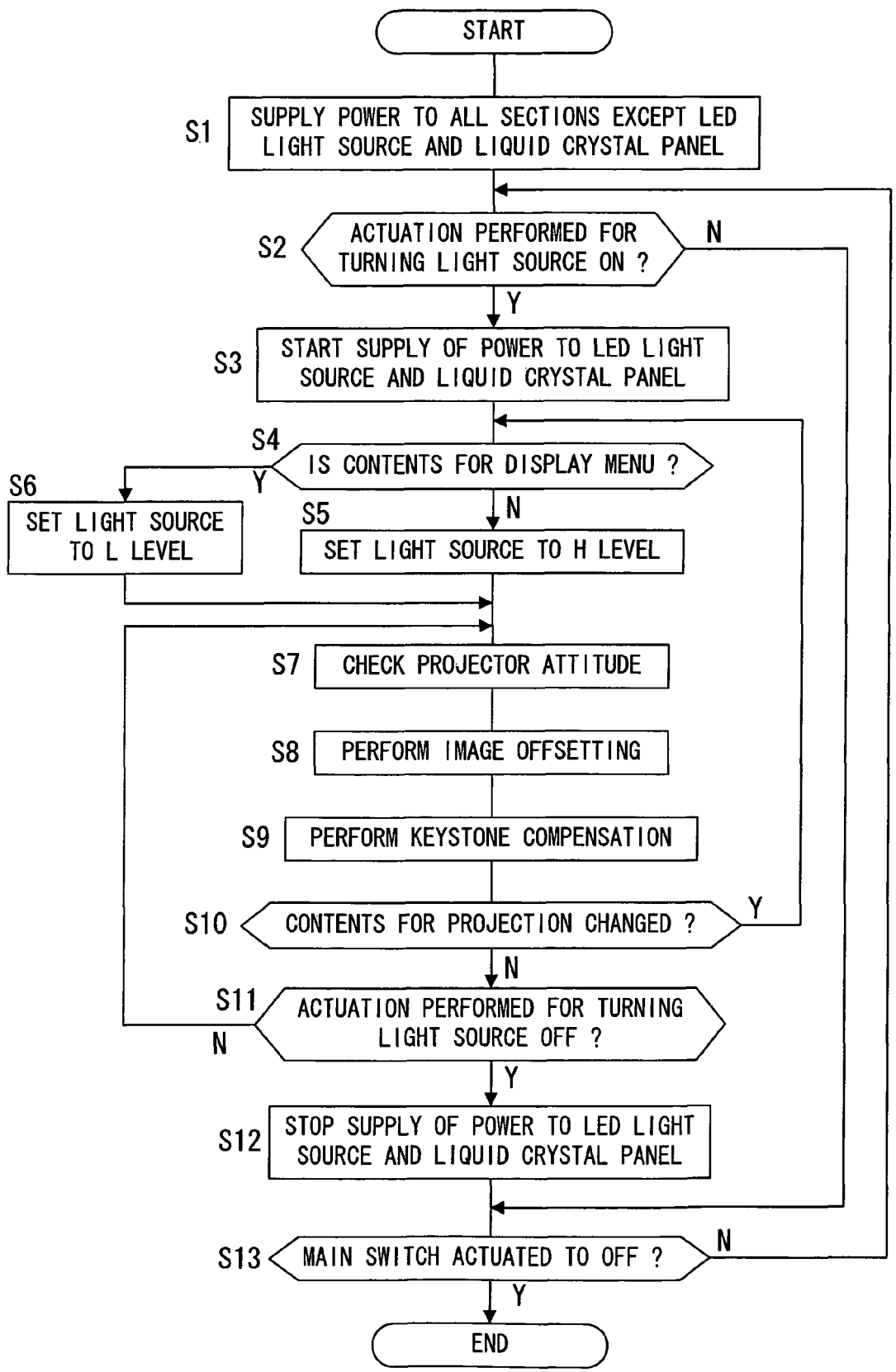
FIG. 5 is a flow chart for explanation of a processing flow that is performed by a CPU for main processing.

The flow of a main processing program that is executed by the CPU 101 of the projector 10 described above will now be explained with reference to the flow chart of FIG. 5. The processing of FIG. 5 is started when a main switch that is included in the operation member 103 is actuated so as to be turned to ON. In a step S1 of FIG. 5, the CPU 101 sends a command to the power supply circuit 107 so as to start supply of electrical power to the various portions of the projector, with the exception of the LED light source 123 and the liquid crystal panel 122, and then the flow of control proceeds to a step S2.

In the step S2, the CPU 101 decides whether or not actuation for turning the light source ON (i.e. for starting projection) has been performed. If either an ON actuation signal from a light source ON/OFF switch that is included in the operation member 103 or an ON signal from the opening angle detection switch 110 has newly been inputted, then an affirmative decision is reached in this step S2, and the flow of control proceeds to a step S3, while if no such signal has been newly inputted a negative decision is reached in this step S2, and the flow of control proceeds to a step S13.

In the step S3, the CPU 101 issues a command to the projection control circuit 124 and starts supply of electrical current to the LED light source 123 and to the liquid crystal panel 122, and then the flow of control proceeds to a step S4. Due to this, a ray bundle B is emitted from the projector 10, and an optical image is projected upon the screen.

The projector 10 is adapted to project and replay contents selected from the following types of projection source contents. The CPU 101 selects the contents for projection according to a setting actuation signal from the operation member 103. And the CPU 101 transmits the data for the selected contents to the projection control circuit 124, and thereby an optical image corresponding to the data is generated upon the liquid crystal panel 122.

1. An image and audio based upon data read out from the memory card 200;
2. An image and audio based upon data received by the wireless communication unit 210;
3. An image and audio based upon data inputted from the external interface 106;
4. An operation menu image and audio for setting the functions of the projector 10.

In the step S4, the CPU 101 decides whether or not the contents for projection is "menu". If the CPU 101 is selecting "4" described above as the contents for projection, then an affirmative decision is taken in this step S4 and the flow of control proceeds to a step S6, while if "4" described above is not being selected, then a negative decision is taken in this step S4 and the flow of control proceeds to a step S5.

In the step S5, the CPU 101 issues a command to the projection control circuit 124 to set the luminance of the light source to high (H) level, and then the flow of control proceeds to a step S7. Due to this, the value of the electrical current that is being supplied to the LED light source 123 is adjusted to high level, and the liquid crystal panel 122 is illuminated at high luminance as is appropriate for projection of an image.

On the other hand, in the step S6, the CPU 101 issues a command to the projection control circuit 124 to set the luminance of the light source to low (L) level, and then the flow of control proceeds to the step S7. Due to this, the value of the electrical current that is being supplied to the LED light source 123 is adjusted to a somewhat lower level than during projection of an image, and the liquid crystal panel 122 is illuminated at low luminance as is appropriate for projection of text or the like.

In the step S7, the CPU 101 performs checking of the attitude of the projector 10. Here, based upon the attitude detection signal from the attitude sensor 130, the CPU 101 decides whether the projector 10 is in the storage attitude of FIGS. 1(*a*) through 1(*c*) or any one the attitudes shown in FIGS. 2(*a*) through 2(*c*), and then the flow of control proceeds to the step S8.

In this step S8, the CPU 101 performs offsetting processing for the projected image, and then the flow of control proceeds to a step S9. The CPU 101 issues a command to the projection control circuit 124 to shift the projection lens 121, so as to ensure that no portion of the ray bundle B strikes any potential obstruction, as described above. The data for the amount by which the projection lens 121 should be shifted is stored in advance within the CPU 101. And the CPU 101 reads out the data for the amount by which the projection lens 121 should be shifted according to the state of the projector 10 that has been checked in the step S7, and sends a shift command along with this data to the projection control circuit 124.

In the step S9, the CPU 101 performs keystone processing for the projected image, and then the flow of control proceeds to a step S10. The CPU 101 reads out an initial compensation value according to the state of the projector 10 that was checked in the step S7, and transmits the data for the image to be projected to the projection control circuit 124 after having performed keystone compensation thereupon using this compensation value.

And, in the step S10, the CPU 101 decides whether or not the contents to be projected have been changed. If an actuation signal that changes the contents to be projected is being inputted from the operation member 103, then the CPU 101 reaches an affirmative decision in this step S10 and the flow of control returns to the step S4, whereas if no such actuation signal for changing the contents to be projected is being inputted, then the CPU reaches a negative decision in this step S10, and the flow of control proceeds to a step S11.

In this step S11, the CPU 101 takes a decision as to whether or not actuation to turn the light source OFF (i.e. to terminate projection) is performed. If either an OFF actuation signal from the light source ON/OFF switch that is included in the operation member 103 or an OFF signal from the opening angle detection switch 110 is newly being inputted, then an affirmative decision is reached in this step S11, and the flow of control proceeds to a step S12, while if no such signal is being newly inputted then a negative decision is reached in this step S11, and the flow of control returns to the step S7. If the flow of control thus returns to the step S7, projection is continued while the attitude of the projector 10 is checked again.

In the step S12, the CPU 101 issues a command to the projection control circuit 124 to stop supply of electrical power to the LED light source 123 and to the liquid crystal panel 122, and then the flow of control proceeds to a step S13. By doing this, the projection of the optical image from the projector 10 ceases. It should be understood that, since the supply of electrical power from the power supply board 52 to the various other circuitry upon the main circuit board 51 is continued, accordingly, if the source for the contents to be projected is "1" as described above, then the information of the memory card 200, and the data that has been read in from the memory card 200, are stored in the memory 102. In a similar manner, if the source for the contents to be projected is "2" as described above, then communication between the wireless communication unit 210 and the external device is continued, and the data that has been received by the wireless communication unit 210 are stored in the memory 102. Moreover, if the source for the contents to be projected is "3" as described above, then communication between the external interface 106 and the external device is continued, and the data that has been received by the external interface 106 are stored in the memory 102.

In the step S13, a decision is made as to whether or not the main switch that is included in the operation member 103 is turned to OFF. If an OFF actuation signal is being inputted, then the CPU 101 makes an affirmative decision in this step S13, and performs power supply OFF processing and terminates supply of electrical power to the various sections upon the main circuit board 51, and then the processing shown in FIG. 5 is terminated. On the other hand, if no such OFF actuation signal is being inputted, then the CPU 101 makes a negative decision in this step S13, and the flow of control returns to the step S2.

If actuation to turn the light source ON is performed after return to the step S2, then projection is immediately resumed using the data that is stored in the memory 102.

According to the first embodiment of the present invention as explained above, the following operational effects can be obtained.

(1) This projector 10 is constructed so that the projector unit 2 that includes the projection optical system 12 (the opening 21) and the control unit 1 that includes the operation member 103 are separated from one another, and so that both of them are mutually supported by the hinge unit 3 so that they can rotate freely with respect to one another, and moreover so that the optical axis of projection by the projector unit 2 (the center line of the ray bundle B) is included in a plane that is perpendicular to the rotation shaft of the hinge unit 3. Due to this, it is possible simply and easily to adjust the projection direction only by rotating the hinge unit 3, with the control unit 1 still in the same state, placed upon a support surface just as it is (or held in the hand of the user). Accordingly, it is possible to provide a projector (the projection device 10) that is compact and well adapted to projection application.

(2) Since the structure is such that, when the projector 10 is mounted upon a planar support surface, either the upper surface 1*a* of the control unit 1 or its lower surface 1*b* is placed facing downwards, and these are the ones having the broadest areas among the surfaces of the control unit 1 and of the projector unit 2, accordingly the projector 10 is well stabilized upon the supporting plane, whichever of the states shown in FIGS. 2(*a*) through 2(*c*) it may be set to.

(3) Since, with regard to the battery 108 and the heat dissipation member 53, that are those of the structural members contained within the two chassis whose masses are the largest, along with providing the former within the control unit 1, the latter is disposed within the projector unit 2, and moreover it is arranged to provide these two elements in diagonally opposed positions, accordingly the center of gravity of the projector 10 does not deviate, so that it becomes easy for the projector 10 to be grasped by the user.

(4) Since it is arranged to provide the hinge unit 3 at one end of the projector unit 2 in its longitudinal direction, and to provide the opening 21 at its other end, accordingly it is possible to maintain the height from the mounting plane of the control unit 1 to the ray bundle B, particularly in the states of the projector shown in FIGS. 2(*a*) and 2(*c*). By making the position of the ray bundle B (i.e. of the opening 21) higher, the fear that a portion of the ray bundle B may strike the control unit 1 or the mounting plane is reduced. If the projector 10 is made to be of an ultra-compact structure (for example, cigarette case sized or smaller), then it is important to keep the height from the mounting plane to the ray bundle B as great as possible.

(5) Since it is arranged to provide the lens cover 11 that is extended from the surface 1a of the control unit 1, and to cover the opening 21 of the projector unit 2 when the projector 10 is in the state of being set to its storage attitude (as shown in FIG. 1), accordingly it is possible to protect the projection optical system 12. Furthermore, by making this lens cover 11 as a transparent member, it is possible to perform projection through the lens cover 11, even when the projector 10 is in the state of being set to its storage attitude.

(6) The opening angle detection switch 110 detects the rotational angle of the hinge unit 3, and sends an ON signal when the projector 10 comes not to be in its storage attitude. And it is arranged for the CPU 101 to start projection when it inputs this ON signal from the opening angle detection switch 110 (in the step S3), even though ON actuation of the light source ON/OFF switch is not performed. Accordingly the convenience of use from the point of view of the user is enhanced, as compared to the case if, in order for projection to be started, it were necessary both to change the rotational angle of the hinge unit 3 to a non-storage attitude and then also to perform ON actuation of the light source ON/OFF switch.

(7) Moreover, it is arranged for the opening angle detection switch 110 to detect the rotational angle of the hinge unit 3, and to send an OFF signal when the projector 10 comes to be in its storage attitude. And it is arranged for the CPU 101 to stop projection (in the step S12) when, during projection, it newly inputs this OFF signal from the opening angle detection switch 110, or when OFF actuation of the light source ON/OFF switch is performed. Accordingly the convenience of use from the point of view of the user is enhanced, as compared to the case if, in order for projection to be terminated, it were necessary both to change the rotational angle of the hinge unit 3 to the storage attitude and then also to perform OFF actuation of the light source ON/OFF switch.

(8) Since it is arranged, in the process (7) described above, until the main switch is actuated to OFF, to continue to store the data in the memory 102, and only to stop supply of electrical current to the LED light source 123 and to the liquid crystal panel 122, accordingly it is possible quickly to resume projection using the same data that is still stored in the memory 102, if light source ON actuation is performed for a second time.

(9) Since the operation member 103 and the main circuit board 51 are located in the control unit 1, and the board 123A, that generates the most heat during projection, is located in the projector unit 2, accordingly the heat that is generated on the side of the projector unit 2 is not directly transmitted to the side of the control unit 1. Due to this, it is possible to prevent transmission of any uncomfortable sensation to the operator due to elevation of the temperature of this projector 10, and it is possible to prevent decrease of the reliability of the electronic components upon the boards due to this elevation of temperature. If the projector 10 is made as ultra-compact (for example, cigarette case sized or smaller), then these anti-heat countermeasures become particularly important.

(10) Since the structure is adapted so as to conduct heat from the heat dissipation member 53 to the hinge unit 3, accordingly it is possible to dissipate heat from the hinge unit 3 as well, and thereby the advantageous effect of heat dissipation is enhanced.

(11) Since the structure is adapted so as to conduct heat from the heat dissipation member 53 via the mass of filler material 60 to the chassis of the projector unit 2 as well, accordingly it is possible to dissipate heat from the chassis of the projector unit 2 as well (and particularly from its surface 2c), so that the effect of heat dissipation is enhanced.

(12) Since the surface 2c is not exposed when the projector 10 is in the storage attitude, accordingly there is no fear that the user will mistakenly touch the surface whose temperature is elevated. Moreover, since the temperature seal is adhered to the surface 2c, accordingly it is possible to arouse caution in the user if the projector 10 is in set to any of the non-storage attitudes.

(13) Since the structure is adapted so as to conduct heat from the hinge unit 3 to the chassis of the control unit 1, accordingly it is possible to dissipate heat from the chassis of the control unit 1 as well, and thereby the effect of heat dissipation is enhanced.

(14) Since the thermally insulating seals 65 of banded shape are adhered to the surfaces of the chassis of the control unit 1 and of the projector unit 2, accordingly, even if the temperature of the surfaces of these chassis becomes elevated, there is no fear of the user coming into direct contact with these surfaces.

It would also be acceptable to include a time expired decision in the step S11 described above to determine whether or not the light source is turned OFF (i.e. whether or not projection is to be terminated). In this case, if, for example, a predetermined time period (for example five minutes) has elapsed with no change in the data being projected (i.e. with the same optical image being projected), the CPU 101 would take this time expired signal as being a light source OFF actuation signal and would reach an affirmative decision in the step S11. By doing this, it would be possible to stop useless projection operation automatically, thus suppressing the consumption of electrical power and the accompanying generation of heat.

Although, in the step S12 described above, it was arranged to stop the supply of electrical power to the LED light source 123 and to the liquid crystal panel 122, it would also be acceptable to arrange to provide a structure in which, while maintaining the supply of electrical power to the liquid crystal panel 122 just as it is, the electrical current that is being supplied to the LED light source 123 is reduced to a small level. By thus limiting the electrical power level and performing projection at a low luminance, it is possible to suppress the consumption of electrical power and the accompanying generation of heat, as compared to the case in which projection at high luminance is continued.

Although, according to the above explanation, it was arranged to provide the main switch and the light source ON/OFF switch independently, it would also be acceptable to arrange to provide a single actuation switch for serving both of these functions. For example, if this actuation switch is implemented as a slide switch, then it would be possible to arrange for sliding of this switch from its OFF position through one stage to be equivalent to turning the main switch ON (with the light source OFF), and for further sliding of this switch through a second stage to be equivalent to turning the light source ON (with the main switch also ON).

Although an example was explained above in which the projector 10 was laid upon a mounting plane surface with either the upper surface 1a or the lower surface 1b of the control unit 1 facing downwards, a structure would also be acceptable in which magnets are provided upon the surface 1a and upon the surface 1b, so that the projector 10 can be used by being adhered to a metallic surface such as a ceiling or a wall or the like.

Although an example was explained above in which both of the chassis of the projector 10, i.e. the chassis of the control unit 1 and also the chassis of the projector unit 2, had the shape of rectangular parallelepipeds, it would also be acceptable for one or both of the control unit 1 and the projector unit 2 not necessarily to have the shape of a rectangular parallelepiped, provided that, at least, each of their chassis has a planar surface, with these planar surfaces being mutually opposed to one another. However, in this case as well, the rotation shaft of the hinge unit 3 should be perpendicular to both of these mutually opposing surfaces of the control unit 1 and of the projector unit 2. Since the surfaces at which these chassis oppose one another are not exposed when the projector 10 is in the storage attitude, accordingly, if these surfaces are principally employed as the surfaces through which most heat dissipation takes place, then it is possible to reduce the danger of the user mistakenly touching these surfaces whose temperature is elevated.

Although, in the above explanation, a case was described in which a structure incorporating an optical image formation element utilizing the liquid crystal panel 122 was employed, and in which an optical image was obtained by illuminating an image formed upon the liquid crystal panel 122 with light from the LED light source 123, it would also be acceptable to arrange to provide a structure in which an optical image formation element that emitted its own light is employed. The light source in this case would be constituted by the optical image formation element itself. Such an optical image formation element creates an optical image by causing a point light source corresponding to each of its picture elements to emit light in correspondence to an image signal.

In the following, a second embodiment of the present invention will be explained. Since the physical structure of this projector according to the second embodiment is the same as that of the projector according to the first embodiment described above, explanation thereof will be omitted. In this second embodiment, the projector 10 described above notifies the user of a state in which the voltage of the battery 108 has decreased by using the projected image.

(The Main Processing Program)

Figure 6:
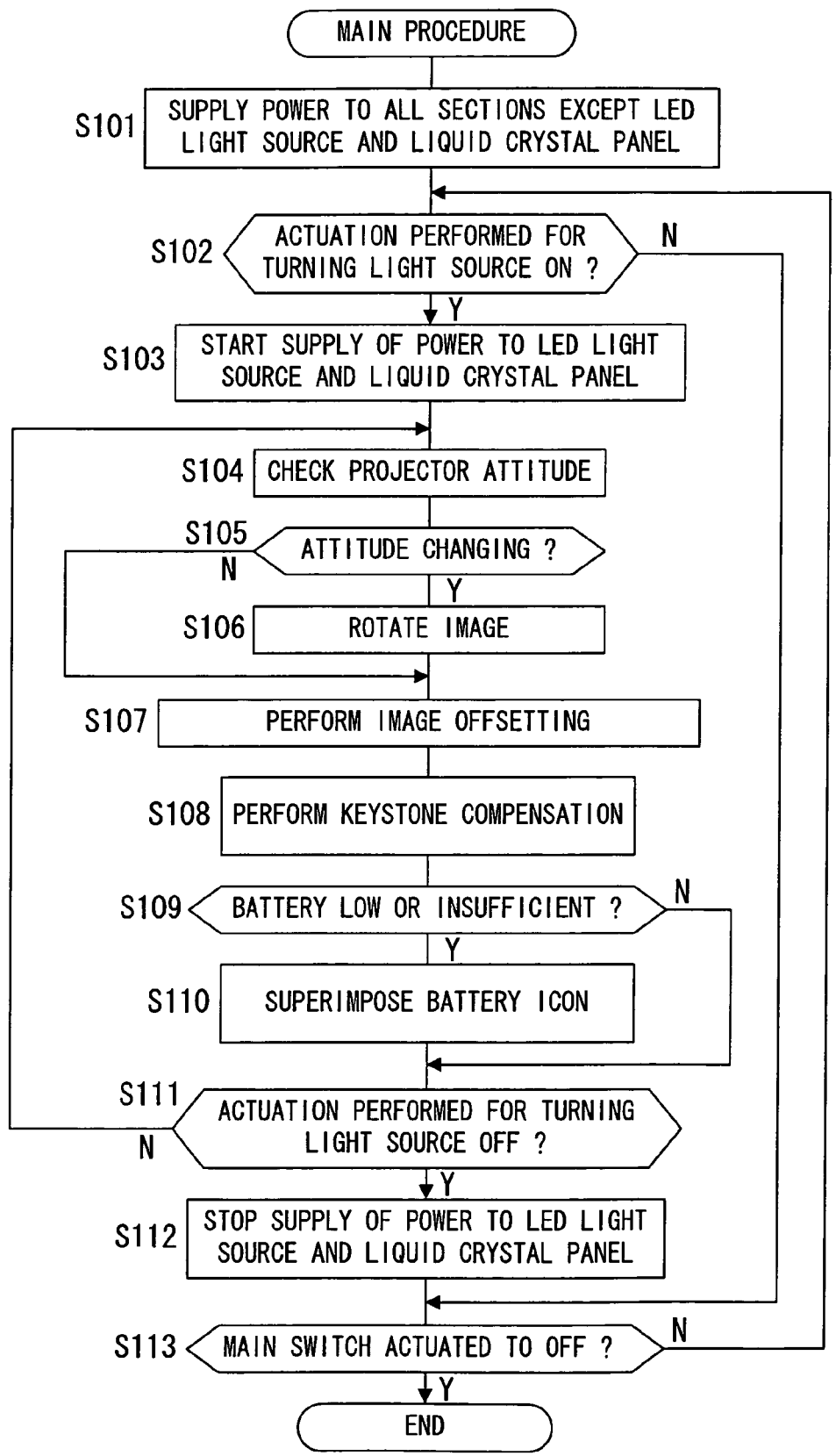
FIG. 6 is a flow chart for explanation of a processing flow that is performed by a CPU for main processing, in a second embodiment of the present invention.

The flow of a main processing program that is executed by the CPU 101 of the projector 10 described above will now be explained with reference to the flow chart of FIG. 6. The processing of FIG. 6 is started when a main switch that is included in the operation member 103 is operated so as to be turned to ON. In a step S101 of FIG. 6, the CPU 101 sends a command to the power supply circuit 107 so as to start supply of electrical power to the various portions of the projector, with the exception of the LED light source 123 and the liquid crystal panel 122, and then the flow of control proceeds to a step S102.

In the step S102, the CPU 101 decides whether or not operation for turning the light source ON (i.e. for starting projection) has been performed. If either an ON actuation signal from a light source ON/OFF switch that is included in the operation member 103 or an ON signal from the opening angle detection switch 110 has newly been inputted, then an affirmative decision is reached in this step S102, and the flow of control proceeds to a step S103, while if no such signal has been newly inputted a negative decision is reached in this step S102, and the flow of control proceeds to a step S113.

In the step S103, the CPU 101 issues a command to the projection control circuit 124 and starts supply of electrical current to the LED light source 123 and to the liquid crystal panel 122, and then the flow of control proceeds to a step S104. Due to this, a ray bundle B is emitted from the projector 10, and an optical image is projected upon the screen.

The projector 10 is adapted to project and replay contents selected from the following types of projection source. The CPU 101 selects the contents for projection according to a setting operation signal from the operation member 103. And the CPU 101 transmits the data for the selected contents to the projection control circuit 124, and thereby an optical image corresponding to the data is generated upon the liquid crystal panel 122.

Source 1: an image and audio based upon data read out from the memory card 200;

Source 2: an image and audio based upon data received by the wireless communication unit 210;

Source 3: an image and audio based upon data inputted from the external interface 106;

Source 4: an operation menu image and audio for setting the functions of the projector 10.

In the step S104, the CPU 101 performs checking of the attitude of the projector 10. Here, based upon the attitude detection signal from the attitude sensor 130, the CPU 101 decides upon which of the storage attitude shown in FIGS. 1(a) through 1(c), and the attitudes of FIGS. 2(a) through 2(c) the projector 10 is taken, and then the flow of control proceeds to a step S105.

In the step S105, the CPU 101 makes a decision as to whether or not the attitude of the projector 10 has been changed. If the attitude of the projector 10 as decided upon in the step S104 is different from its attitude as decided upon in the previous pass through this procedure, then the CPU 101 arrives at an affirmative decision in this step S105 and the flow of control proceeds to a step S106, whereas if the attitude of the projector 10 on this pass through is the same as its attitude in the previous pass through, then the CPU 101 arrives at a negative decision in this step S105 and the flow of control is transferred to a step S107.

In the step S106, the CPU 101 rotates the projected image. If in the step S104 it has been decided that the projector 110 is in the storage attitude shown in FIGS. 1(a) through 1(c), or in either the attitude shown in FIG. 2(b) or the attitude shown in FIG. 2(c), then in this step S106 the CPU 101 sends a command to the projection control circuit 124 to form upon the liquid crystal panel 122 an optical image that is normally oriented, in correspondence to the data for the contents to be projected.

On the other hand, if in the step S104 it has been decided that the projector 10 is in the attitude shown in FIG. 2(a), then in this step S106 the CPU 101 sends a command to the projection control circuit 124 to rotate the image that is formed upon the liquid crystal panel 122 so that the optical image to be projected is rotated through 180° from the normal orientation.

In the step S107 of FIG. 6, the CPU 101 performs offsetting processing for the projected image, and then the flow of control proceeds to a step S108. The CPU 101 issues a command to the projection control circuit 124 to shift the projection lens 121, so as to ensure that no portion of the ray bundle B strikes any potential obstruction, as described above. The data for the amount by which the projection lens 121 should be shifted is stored in advance within the CPU 101. And the CPU 101 reads out the data for the amount by which the projection lens 121 should be shifted according to the state of the projector 10 that has been checked in the step S104, and sends a shift command along with this data to the projection control circuit 124.

In the step S108, the CPU 101 performs keystone processing for the projected image, and then the flow of control proceeds to a step S109. The CPU 101 reads out an initial compensation value according to the state of the projector 10 that was checked in the step S104, and transmits the data for the image to be projected to the projection control circuit 124 after having performed keystone compensation thereupon using this compensation value.

In the step S109, by battery check processing that will be described hereinafter, the CPU 101 makes a decision as to whether or not "the battery is low" or "the battery is insufficient", that indicate the state of electrical discharge of the battery 108. If the CPU 101 decides that "the battery is low" or "the battery is insufficient", then it reaches an affirmative decision in the step S109 and the flow of control proceeds to a step S110; while, if the CPU 101 decides that "the battery is full" or "the battery is medium", then it reaches a negative decision in the step S109 and the flow of control is transferred to a step S111.

In the step S110, the CPU 101 sends a command to the projection control circuit 124 thereby creating and superimposing an image of a battery icon upon the optical image to be projected, and then the flow of control proceeds to the step S111. In concrete terms, by combining the data for a battery icon with the data for the contents to be projected, and by transmitting the data after combination to the projection control circuit 124, the CPU 101 creates an optical image upon the liquid crystal panel 122 upon which the battery icon is superimposed.

As for the position in which this battery icon is combined upon the contents image, in the case of a still image, this should be a position that avoids the position in which the date and time information are superimposed. For example, in the case of an image in landscape format, the battery icon may be superimposed in the upper left of the image, so as to avoid the lower right of the image. On the other hand, in the case of an image in portrait format, the battery icon may be superimposed in the lower right of the image, so as to avoid the upper right and the lower left of the image.

Furthermore, the CPU 101 colors the battery icon to be combined differently from the color of the contents image. In other words, the CPU 101 checks upon the contents image the color of the region in which the battery icon is to be superimposed (i.e. a color that is equivalent to the background color for the battery icon), creates a battery icon image using a color that is different from this background color, and superimposes this battery icon that it has created upon the contents image.

In the step S111, the CPU 101 makes a decision as to whether or not actuation to turn the light source OFF (i.e. to terminate projection) is performed. If either an OFF actuation signal from the light source ON/OFF switch that is included in the operation member 103 or an OFF signal from the opening angle detection switch 110 is newly being inputted, then an affirmative decision is reached in this step S111, and the flow of control proceeds to a step S112, while if no such signal is being newly inputted then a negative decision is reached in this step S111, and the flow of control returns to the step S104. If the flow of control thus returns to the step S104, projection is continued while the attitude of the projector 10 and the state of the amount remaining in the battery 108 are checked again.

In the step S112, the CPU 101 issues a command to the projection control circuit 124 to stop supply of electrical power to the LED light source 123 and to the liquid crystal panel 122, and then the flow of control proceeds to a step S113. By doing this, the projection of the optical image from the projector 10 ceases. It should be understood that, since the supply of electrical power to the various other circuitry such as the CPU 101 and, as well, the memory 102, the memory card 200, the wireless communication unit 210, the external interface 106 and the like is continued, accordingly, if the source for the contents to be projected is Source 1 as described above, then the information of the memory card 200, and the data that has been read in from the memory card 200, are stored in the memory 102. In a similar manner, if the source for the contents to be projected is Source 2 as described above, then communication between the wireless communication unit 210 and the external device is continued, and the data that has been received by the wireless communication unit 210 are stored in the memory 102. Moreover, if the source for the contents to be projected is Source 3 as described above, then communication between the external interface 106 and the external device is continued, and the data that has been received by the external interface 106 are stored in the memory 102.

In the step S113, a decision is made as to whether or not the main switch that is included in the operation member 103 is turned OFF. If an OFF actuation signal is being inputted, then the CPU 101 makes an affirmative decision in this step S113, and performs power supply OFF processing and terminates supply of electrical power to the various sections, and then the processing shown in FIG. 6 is terminated. On the other hand, if no such OFF actuation signal is being inputted, then the CPU 101 makes a negative decision in this step S113, and the flow of control returns to the step S102.

If actuation to turn the light source ON is performed after return to the step S102, then projection is immediately resumed using the data that is stored in the memory 102.

(Slide Show Processing)

Slide show processing starts, if the source 1 described above for the contents to be projected is selected, and moreover an actuation signal that commands slide show projection starts is inputted to the CPU 101 from the operation member 103 during projection according to the main processing routine shown in FIG. 6 (i.e. the steps S103 through S111). FIG. 7 is a flow chart for explanation of the processing flow during such slide show processing.

In a step S21 of FIG. 7, the CPU 101 reads out remaining capacity data A·h for the battery 108 from a lookup table (LUT), and then the flow of control proceeds to a step S22. This LUT consists of a relationship between the voltage of the battery 108 and its remaining capacity that is actually measured in advance, this relationship being converted into a table and being stored in a non-volatile memory (not shown in the figures) within the CPU 101. The CPU 101 reads out the remaining capacity data A·h from this LUT by using as an argument the value of the voltage of the battery 108, as detected by battery check processing that will be described hereinafter.

In the step S22, the CPU 101 estimates a time period R over which projection is possible by calculation according to the equation R=(A·h)/In. Here, the electrical current In is the average value of electrical current consumption over a predetermined immediately precedent time period (for example during the last ten seconds), and this is transmitted to the CPU 101 from the power supply circuit 107 as electrical current consumption information. And, when the CPU 101 has estimated the time period R over which projection is possible, the flow of control proceeds to a step S23.

In this step S23, the CPU 101 decides whether or not the condition that the estimated time period R over which projection is possible≧(number of frames×standard projection time period tn for one frame) holds. The number of frames is the number of images for which projection by a slide show is commanded. This number of frames is commanded according to the actuation signal from the operation member 103. If the above condition holds, then the CPU 101 reaches an affirmative decision in this step S23 and the flow of control is transferred to a step S27, whereas, if the above condition does not hold, then the CPU 101 reaches a negative decision in this step S23 and the flow of control proceeds to a step S24. If the flow of control thus proceeds to the step S24, then this is the case in which an estimation has been reached that, partway through the projection of the slide show, the remaining capacity of the battery 108 will be insufficient. On the other hand, if the flow of control is transferred to the step S27, then this is the case in which the necessary remaining capacity of the battery 108 for projecting the slide show is assured. If the flow of control is transferred to the step S27, then the CPU 101 sends a command to the projection control circuit 124, and maintains the present electrical current value that is being supplied to the LED light source 123.

On the other hand, in the step S24, the CPU 101 estimates the time period Rs over which projection is possible during economization of electrical current consumption, according to the calculation equation $Rs=(A \cdot h)/Is$. Here, the electrical current Is is the amount of electrical current that is consumed during electrical current economization, and, for example, may be 70% of the most recent electrical current consumption In described above. When the CPU 101 has estimated this time period Rs over which projection is possible, then the flow of control proceeds to a step S25.

In this step S25, the CPU 101 makes a decision as to whether or not the condition that this new estimated time period Rs over which projection is possible≧(number of Frames×standard projection time period tn for one frame) holds. If the above condition holds, then the CPU 101 reaches an affirmative decision in this step S25 and the flow of control is transferred to the step S27, whereas, if the above condition does not hold, then the CPU 101 reaches a negative decision in this step S25 and the flow of control proceeds to a step S26. If the flow of control thus proceeds to the step S26, then this is the case in which, even if the electrical power consumption is economized, nevertheless, partway through the projection of the slide show, the remaining capacity of the battery 108 will be insufficient. On the other hand, if the flow of control is transferred to the step S27, then this is the case in which, if the electrical power consumption is economized, then the remaining capacity of the battery 108 will be sufficient for projecting the slide show. If the flow of control is transferred to the step S27, then the CPU 101 sends a command to the projection control circuit 124 and decreases the electrical current value that is being supplied to the LED light source 123, so that the overall consumption of electrical current is decreased to 70% of the most recent value of consumed electrical current In. The CPU 101 further sends a command to the projection control circuit 124, so as to perform image processing such as gamma compensation or the like in order to compensate for the decrease of projection luminance due to this reduction of the electrical current supplied to the LED light source 123.

In a step S26, the CPU 101 calculates the value of the shortened projection time period ts per one frame according to the formula ts=Rs/(the number of frames). Moreover the CPU 101, along with changing the projection time period for one frame when projecting a slide show from the standard projection time period tn to this shortened projection time period ts, also decreases the value of the electrical current that is supplied to the LED light source 123, so as to decrease the electrical current consumption to 70% of the most recent electrical current consumption In; and then the flow of control proceeds to a step S27. The feature that image processing such as gamma compensation and the like is performed in order to compensate for the decrease of projection luminance due to this reduction of the value of the electrical current supplied to the LED light source 123, is the same as in the case when an affirmative decision is made in the step S25 described above.

In the step S27 the CPU 101, along with reading out the image data from the memory card 200, also sends data for display by projection to the projection control circuit 124 and commands the circuit 124 to project a replay image based thereupon; and then the flow of control proceeds to a step S28. Due to this, a replay image is projected by the projector 10.

In this step S28, the CPU 101 decides whether or not time up has taken place. And, if the above described standard projection time period tn (or the shortened projection time period ts, if the flow of control has arrived at this point via the step S26) has elapsed, then the CPU 101 reaches an affirmative decision in this step S28 and the flow of control proceeds to a step S29, whereas if time up has not yet occurred then the CPU 101 reaches a negative decision in this step S28 and repeats the same decision processing.

In the step S29, the CPU 101 makes a decision as to whether or not projection of all the frames has been completed. And, if projection has been completed for images of all of the frames that were commanded to be projected in this slide show, then the CPU 101 reaches an affirmative decision in this step S29, and the slide show processing shown in FIG. 7 is terminated. On the other hand if projection has not been completed for all of the frames, then the CPU 101 reaches a negative decision in this step S29, and the flow of control proceeds to a step S30.

In this step S30, the CPU 101 makes a decision as to whether or not stopping actuation has been performed. If an actuation signal has been inputted from the operation member 103 to stop projection of the slide show, then the CPU 101 reaches an affirmative decision in this step S30, and the slide show processing shown in FIG. 7 is terminated. On the other hand, if no such actuation signal has been inputted from the operation member 103 to stop projection of the slide show, then the CPU 101 reaches a negative decision in this step S30, and the flow of control returns to the step S27. In the case of such a return to the step S27, the CPU 101, along with reading out image data for the next frame from the memory card 200, also sends this data for projection display to the projection control circuit 124 and commands projection of a replay image, and then the flow of control proceeds to the step S28. Due to this, a replay image for the next frame is projected from the projector 10.

(Battery Check Processing)

The details of the battery check processing in which the state of electrical discharge of the battery 108 is detected will now be explained with reference to the flow chart of FIG. 8. This battery check processing of FIG. 8 is started periodically at predetermined time intervals as interrupt processing, even during execution of the flow chart of FIG. 6 (the main procedure) or during execution of the flow chart of FIG. 7 (slide show processing).

In a step S51 of FIG. 8 the CPU 101 performs a voltage check of the battery 108, and then the flow of control proceeds to a step S52. This voltage check is performed by inputting the detection signal that is detected by the power supply circuit 107.

In the step S52, the CPU 101 decides whether or not the voltage of the battery 108 is, for example, greater than or equal to 3.5 V. If a voltage of greater than or equal to 3.5 V is detected, then the CPU 101 reaches an affirmative decision in this step S52 and the flow of control proceeds to a step S53, whereas, if the detected voltage is less than 3.5 V, then the CPU 101 reaches a negative decision in this step S52 and the flow of control proceeds to a step S54.

In the step S53 the CPU 101 decides that the battery 108 is fully charged (in the case of the primary battery, that its electrical discharge proportion is approximately 0%), and a battery icon that shows "battery full" (i.e. with all three segments illuminated) is decided upon and the processing of FIG. 8 terminates. In this first embodiment, this battery icon that shows "battery full" is not particularly utilized.

In the step S54, the CPU 101 decides whether or not the voltage of the battery 108 is, for example, greater than or equal to 3.0 V and less than 3.5 V. If a voltage between 3.0 V and 3.5 V is detected, then the CPU 101 reaches an affirmative decision in this step S54 and the flow of control proceeds to a step S55, whereas, if the detected voltage is less than 3.0 V, then the CPU 101 reaches a negative decision in this step S54 and the flow of control proceeds to a step S56.

In the step S55, the CPU 101 decides that the charge proportion of the battery 108 is medium (in the case of the primary battery, that its electrical discharge proportion is approximately 50%), and a battery icon that shows "battery medium" (i.e. with two segments illuminated and one segment not illuminated) is decided upon and the processing of FIG. 8 terminates. In this first embodiment, this battery icon that shows "battery medium" is not particularly utilized.

In the step S56, the CPU 101 decides whether or not the voltage of the battery 108 is, for example, greater than or equal to 2.7 V and less than 3.0 V. If a voltage between 2.7 V and 3.0 V is detected, then the CPU 101 reaches an affirmative decision in this step S56 and the flow of control proceeds to a step S57, whereas, if the detected voltage is less than 2.7 V, then the CPU 101 reaches a negative decision in this step S56 and the flow of control proceeds to a step S58.

In the step S57, the CPU 101 decides that the charge proportion of the battery 108 is low (in the case of the primary battery, that its electrical discharge proportion is approximately 70%), and a battery icon that shows "battery low" (i.e. with one segment illuminated and two segments not illuminated) is decided upon and the processing of FIG. 8 terminates. This battery icon that shows "battery low" is utilized in the step S110 of FIG. 6.

In the step S58, the CPU 110 decides whether or not the voltage of the battery 108 is, for example, greater than or equal to 2.5 V and less than 2.7 V. If a voltage between 2.5 V and 2.7 V is detected, then the CPU 101 reaches an affirmative decision in this step S58 and the flow of control proceeds to a step S59, whereas, if the detected voltage is less than 2.5 V, then the CPU 101 reaches a negative decision in this step S58 and the flow of control proceeds to a step S60.

In the step S59, the CPU 101 decides that the charge proportion of the battery 108 is extremely low (in the case of the primary battery, that its electrical discharge proportion is approximately 90%), and a battery icon that shows "battery insufficient" (i.e. with all three of its segments not illuminated and with its frame blinking) is decided upon and the processing of FIG. 8 terminates. This battery icon that shows "battery insufficient" is utilized in the step S110 of FIG. 6.

If the flow of control reaches the step S60, then the system is in a state in which the voltage of the battery 108 does not attain the necessary voltage for operating the various sections of the projector 10 (i.e. its remaining capacity is insufficient). Accordingly, in this step S60, the CPU 101 makes a decision as to whether or not a slide show is being projected. If the system is performing the slide show processing of FIG. 7, then the CPU 101 reaches an affirmative decision in this step S60 and the flow of control proceeds to a step S61, whereas, if the slide show processing of FIG. 7 is not being performed, then the CPU 101 reaches a negative decision in this step S60 and the flow of control proceeds to a step S62.

If the flow of control reaches the step S61, then this represents the case in which the voltage of the battery 108 has decreased in a shorter time period than the time period R (or Rs) over which projection is possible, having been estimated in the FIG. 7 flow chart. Thus, in this step S61, the CPU 101 stores, in a non-volatile memory within the CPU 101, information that specifies the frame to be projected (for example, the title of its image data file), and information that specifies the frames that have not yet been projected, for slide show processing next time when the starting of slide show projection is commanded after the battery 108 has been exchanged for another fully charged battery (or the battery 108 itself has been charged up); and then the flow of control proceeds to the step S62.

In this step S62, the CPU 101 performs power supply OFF processing in which the supply of electrical power to the various sections of the apparatus is turned OFF, and then the processing of FIG. 8 is terminated. Due to this, before the voltage of the battery 108 becomes absolutely insufficient and the CPU 101 actually becomes inoperable, the necessary information is stored and then power supply OFF processing is performed.

According to the second embodiment of the present invention as explained above, the following operational effects can be obtained.

(1) It is arranged for the projector 10 to check the voltage of the battery 108 at predetermined intervals, and, if the electrical discharge state of the battery 108 is either "battery low" or "battery insufficient", for a battery icon (battery information) that specifies the state of electrical discharge of the battery 108 to be created and superimposed upon the projected image (the steps S109 and S110). Due to this, it is easier for the user to appreciate the contents being projected, as compared to a case in which a battery icon that specifies the state of electrical discharge of the battery 108 is always superimposed upon the projected image. Furthermore, it is possible to supply a projector (a projection device) 10 with that it is ensured that the user is not inconvenienced by sudden battery power interruption. It should be understood that the design of the battery icon that is created and superimposed upon the projected image is not to be considered as being limited to the design shown in FIG. 8.

(2) Since the position at that the battery icon is created and superimposed upon the image of the contents to be projected is arranged to avoid the position at that, in the case of a still image, the date and time information is superimposed, accordingly it is possible to prevent the battery icon from overlaying the date and time information, that would make the date and time information hard to see.

(3) Since, in addition to (2) above, the color of the battery icon is made to be different from the color of the image of the contents to be projected (i.e. from the color of the region thereof over which the battery icon is superimposed), accordingly it is possible to prevent the battery icon from becoming absorbed in its background and thus becoming hard to see.

(4) Since the battery icon is made to blink during the "battery insufficient" condition, accordingly it is possible to notify the user of this state of decrease of battery capacity in a clear and unambiguous manner.

(5) When projection of a slide show is commanded, the time period R over which projection is possible is estimated (in the step S22) based upon the voltage of the battery 108 that is detected, and, if the time period required for slide show projection is longer than this time period R over which projection is possible (a negative decision in the step S23), then it is arranged (in the step S24) to economize the electrical current consumed from the battery 108 by 30%, from In to Is.

Due to this, it is possible to ensure that, partway through the projection of a slide show, the remaining capacity of the battery 108 does not become insufficient.

(6) It is arranged to estimate the time period Rs over which slide show projection is possible for a second time (in the step S24) based upon the electrical current consumption during economization, and, if the time period required for slide show projection is longer than this time period Rs over which projection is possible during economization (a negative decision in the step S25), then it is arranged to fit the required time period for slide show projection within the time period Rs over which projection is possible, by shortening the projection time period for one frame from tn to ts (in the step S26). By doing this, it is possible to ensure that, partway through the projection of a slide show, the remaining capacity of the battery 108 does not become insufficient.

(7) Since, if the value of the electrical current that is supplied to the LED light source 123 is decreased, as during economization of the electrical current consumption by 30% from In to Is, then image processing such as gamma compensation or the like is performed (in the steps S25 and S26) in the order to compensate for decrease of the projection luminance due to this reduction of the electrical current, accordingly it is possible to suppress the influence of decrease of the projection luminance, as compared to a case in which such image processing is not performed.

(8) Since it is arranged to turn the power supply OFF automatically (in the step S62) if the voltage of the battery 108 becomes below 2.5 V (a negative decision in the step S58), accordingly it is possible to perform power supply OFF processing promptly, before the CPU 110 becomes inoperable due to deficiency of voltage of the battery 108.

(9) Since, if the above described process (8) takes place during the projection of a slide show, then it is arranged to perform power supply OFF processing (in the steps S61 and S62) after having stored information specifying the next frame to be projected (for example the title of its image data file) and information of frames still remain to be projected in the slide show, in a non-volatile memory within the CPU 101, accordingly it is possible to resume the projection of that slide show when the battery 108 has been exchanged for another fully charged battery (or when the battery 108 itself has been charged up).

The voltage values specified above for the battery 108 are only given by way of example; these decision reference voltages should be changed as appropriate, according to the type of the battery 108 that is used.

A structure may be employed in which, during slide show processing, the battery icon is synthesized and superimposed upon the images that is being projected for slide show as well.

Although, in the explanation provided above, it was arranged to perform power supply OFF processing for storing information specifying the next frame to be projected and the like in the non-volatile memory, only if partway through projection of a slide show the voltage of the battery 108 has become less than the necessary voltage (2.5 V), it would also be acceptable to provide a structure in which this information storage is always performed during power supply OFF processing. In this case, when an OFF actuation signal is inputted from a main switch that is included in the operation member 103 as well, the CPU 101 would store information specifying the next frame to be projected and the like in the non-volatile memory, and would thereafter perform power supply OFF processing.

Variant Embodiment One

Although, in the above described second embodiment of the present invention, when the electrical discharge state of the battery 108 becomes either "battery low" or "battery insufficient", it is arranged to create and superimpose a battery icon that indicates the state of the battery 108 upon the projected image, it would also be acceptable to arrange to create and superimpose a battery icon at the time point that the electrical discharge state becomes "battery medium"; and it would also be acceptable to arrange to create and superimpose a battery icon at the time point that the electrical discharge state becomes "battery insufficient".

Variant Embodiment Two

It would also be acceptable, instead of creating and superimposing a battery icon, to decrease the luminance itself of projection of the image of the contents to be projected. Such a decrease of projection luminance would be performed by decreasing the value of the electrical current that is supplied to the LED light source 123. Since in this case no battery icon is overlaid over the image of the contents to be projected, accordingly this projection contents image is easy to view.

Variant Embodiment Three

If, as in variant embodiment 2, instead of superimposing a battery icon, the luminance of projection of the image of the contents to be projected is decreased, then it would also be acceptable to "blink display" this projection contents image, by changing over repeatedly between this decreased state of projection luminance and the normal state thereof. It would be possible to notify the decrease of the voltage of the battery 108 more aggressively with this "blink display".

Variant Embodiment Four

Furthermore, instead of creating and superimposing a battery icon over the contents image, or decreasing the luminance of projection of the contents image, it would also be acceptable to change the color of the image of the contents to be projected, itself, from a color image to a monochrome image. By projecting a monochrome image instead of a color image, it would be possible reliably to notify the user of decrease of the voltage of the battery 108. Furthermore, the image of the contents being projected would be easy to view, since no battery icon would be overlaid over it.

Variant Embodiment Five

It would also be acceptable to vary the size of the image of the contents to be projected, itself. In this case, when the electrical discharge state of the battery 108 became either "battery low" or "battery insufficient", then the size of the image of the contents to be projected may be varied so that the image is projected at, for example, a 10% reduced size. In the region of the screen that is liberated by this projection at reduced scale, a battery icon or a message that notifies the user that the voltage of the battery 108 has decreased may be projected. Since, with this type of structure, the battery icon or the message is not superimposed over the image of the contents to be projected, accordingly it remains easy to view the contents being projected.

Although, in the above explanation, an example has been described in which the projector 10 is separated into the control unit 1 and the projector unit 2, it would also be acceptable for the control unit 1 and the projector unit 2 to be built with one common chassis.

Moreover although, in the above explanation, an example has been described in which, when projecting a slide show consisting of still images that are recorded upon the memory card 200, a procedure is adopted during projection of the slide show in order to ensure that the remaining capacity of the battery does not become insufficient, it would also be possible to perform the same kind of procedure during projection of a moving image (video) as well. In this case, the CPU 101 would take advantage of the information for replay time period that is included in such a moving image file, and would economize upon the electrical current consumption (i.e. would decrease the value of the electrical current that is supplied to the LED light source 123) so as to fit this replay time period within the time period that it is estimated that projection is possible, based upon the voltage of the battery 108 that is detected.

Although, in the above explanation, a case has been described in which the optical image formation element was constructed using the liquid crystal panel 122, and an optical image was obtained by illuminating an image formed upon the liquid crystal panel 122 with light from the LED light source 123, it would also be acceptable to arrange to utilize an optical image formation element of a type that itself emits light. In this case, the light source would be provided by this optical image formation element. Such an optical image formation element creates an optical image by causing point light sources that correspond to picture elements to emit light for each picture element, in accordance with an image signal.

Although an example has been explained of a projector 10 that is battery driven, the present invention can also be applied to any electronic device that is battery driven and that is equipped with a projector, for example, to a portable telephone device equipped with a projector, or to a camera equipped with a projector or the like.

The explanation above is only provided by way of example, and is not intended, in the interpretation of the present invention, to impose any limitation upon the correspondence relationship between the structural elements of the embodiments described above and the structural elements of the present invention.

The present application is based upon Japanese Patent Application No. 2005-193899 (filed upon 1 Jul. 2005) and Japanese Patent Application 2005-263660 (filed upon 12 Sep. 2005), and hereby incorporates the contents thereof by reference.

The invention claimed is:

1. A projection device, comprising:
a projector unit that comprises at least a light source and a projection optical system housed in a chassis;
a control unit that is assembled with a chassis separate from the chassis of the projector unit; and
a rotation support member that rotatably supports the projector unit and the control unit around a rotation axis that extends perpendicular to a surface of the chassis of the projector unit and a surface of the chassis of the control unit, with these surfaces facing to one another.

2. A projection device according to claim 1, wherein:
the rotation support member is provided at one end of the projector unit in a longitudinal direction of the projector unit; and
the projection optical system is provided towards another end from a center of the projector unit in the longitudinal direction.

3. A projection device according to claim 1, wherein:
the projection optical axis of the projector unit is included in a plane that is perpendicular to the rotation axis of the rotation support member.

4. A projection device according to claim 1, wherein:
the projector unit further comprises a heat dissipation member that dissipates heat generated by the light source; and
the control unit further comprises a battery.

5. A projection device according to claim 1, wherein:
the control unit controls the light source to be turned ON or OFF, according to a rotational angle of the rotation support member.

6. A projection device according to claim 1, wherein:
according to a command for turning the light source OFF, the control unit stops or limits a supply of electrical power to the projector unit, while maintaining a supply of electrical power within the control unit.

7. A projection device according to claim 6, wherein:
according to a time up signal, the control unit stops or limits the supply of electrical power to the projector unit, while maintaining the supply of electrical power within the control unit.

8. A projection device according to claim 4, wherein:
the rotation support member and the heat dissipation member of the projector unit are integrated together so as to conduct heat.

9. A projection device according to claim 4, wherein:
heat is conducted from the heat dissipation member to an inner side of a surface of the projector unit that is opposed to the control unit.

10. A projection device according to claim 4, wherein:
a display corresponding to a surface temperature is brought up on a chassis surface of the projector unit or of the control unit.

11. A projection device according to claim 4, wherein:
a seal made from a thermally insulating material in a shape of a band is adhered to a surface of at least one of the chassis of the projector unit and the chassis of the control unit.

12. A projection device, comprising:
a projection unit that projects an image;
a voltage detection device that detects a voltage of a battery that drives the projection unit; and
a projection control device;
wherein if the voltage detected by the voltage detection device is lower than a predetermined value, the projection control device controls the projection unit to reduce an electrical power to be consumed by a light source of the projection device and thereby decrease a luminance of a projection image to compensate for the detected voltage being lower than the predetermined value, and the projection control device further controls the projection unit to execute image processing so as to compensate for the decrease in the luminance of the projection image.

13. A projection device according to claim 12, further comprising:
a possible projection time period estimation device that estimates, using the voltage detected by the voltage detection device, a time period over which projection is possible; and wherein:
if a time period required for projection by the projection unit is longer than the time period over which projection is possible as estimated by the possible projection time period estimation device, the projection control device controls the projection unit so as to reduce an electrical power to be consumed by the light source of the projection device, thereby lowering a luminance of the projection image.

14. A projection device according to claim 13, wherein:
the possible projection time period estimation device again estimates a time period over which projection is possible in a state in which the electrical power to be consumed has been reduced; and
if the time period required for projection by the projection unit is longer than the time period over which projection is possible as thus re-estimated by the possible projection time period estimation device, the projection control device controls the projection unit so as to shorten the time period required for projection.

15. A projection device according to claim 12, wherein:
the image processing is gamma compensation.

* * * * *